G. W. TANNER & F. D. BLISS.
CIGAR WRAPPING MACHINE.

No. 105,140.  Patented July 5, 1870.

Witnesses:
Phil. F. Larner
Frank A. Jackson

Inventors:
George W. Tanner
F. D. Bliss
By Wm. C. Wood
Attorney

G. W. TANNER & F. D. BLISS.
CIGAR WRAPPING MACHINE.

No. 105,140. Patented July 5, 1870.

Witnesses:
Phil. F. Larner
Frank A. Jackson

Inventors:
George W. Tanner
F. D. Bliss
By Wm C Wood
Attorney

United States Patent Office.

GEORGE W. TANNER AND FRANK D. BLISS, OF PROVIDENCE, RHODE ISLAND.

Letters Patent No. 105,140, dated July 5, 1870.

IMPROVEMENT IN CIGAR-WRAPPING MACHINES.

The Schedule referred to in these Letters Patent and making part of the same

*To all whom it may concern:*

Be it known that we, GEORGE W. TANNER and FRANK D. BLISS, of the city and county of Providence and State of Rhode Island, have invented a certain new and useful Cigar-wrapping Machine.

Our invention consists in certain novel combinations of rollers and gearing, and also in the construction and arrangement of the same; and we do hereby declare that the following specification, taken in connection with the drawing furnished and forming a part of the same, is a clear, true, and exact description thereof.

Reference being had to the drawing—

Figure 1:
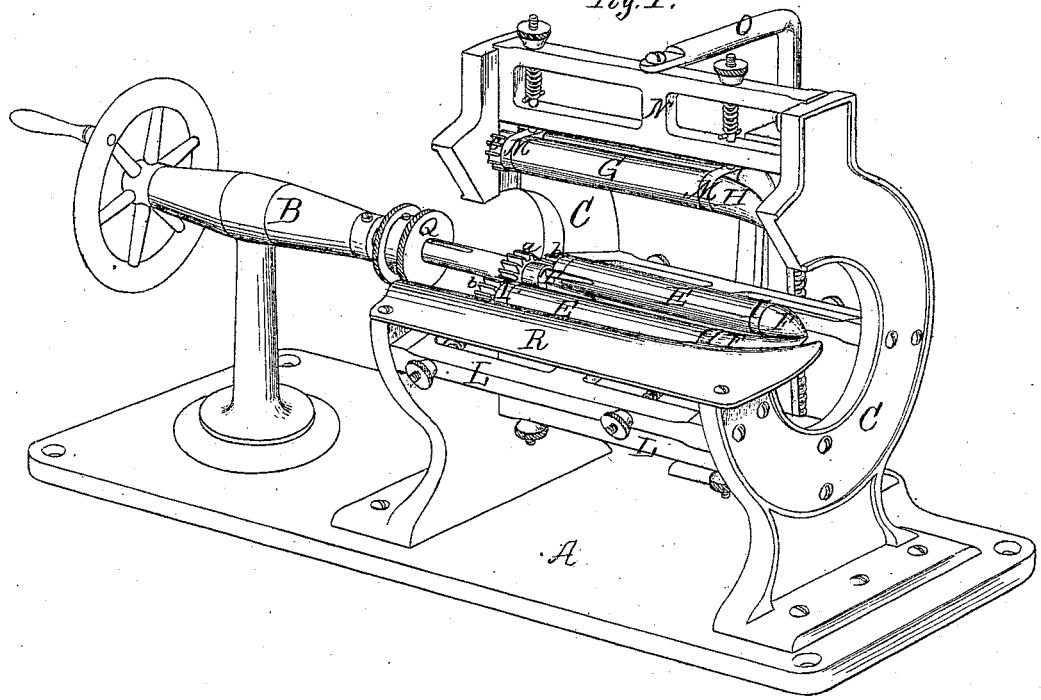
Figure 1 represents, in perspective, one of our machines.
Figure 2:
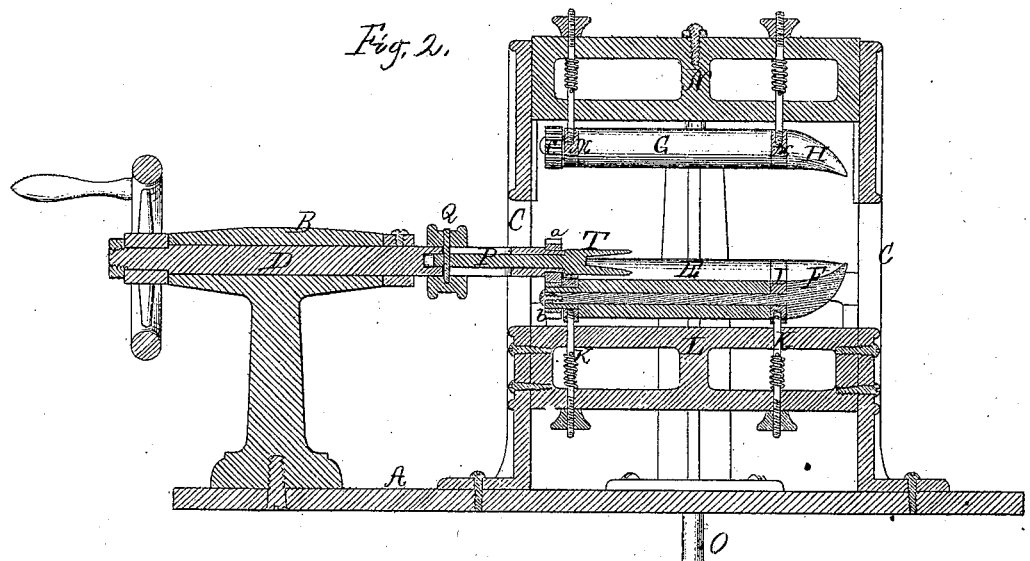
Figure 2 represents the same in longitudinal vertical section.
Figure 3:
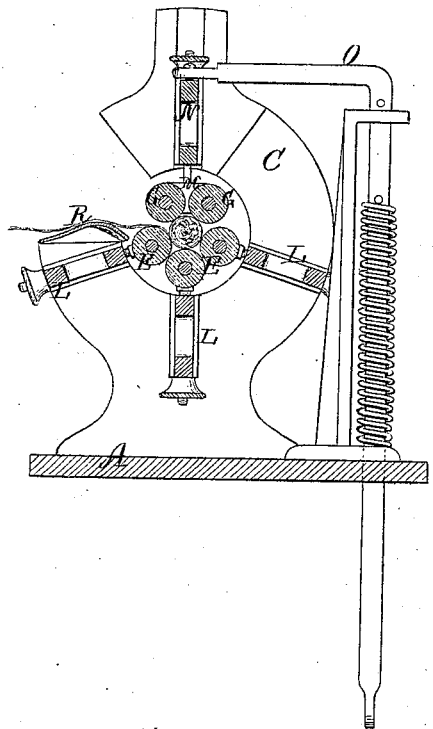
Figure 3 represents the same in cross-vertical section.
Figure 4:
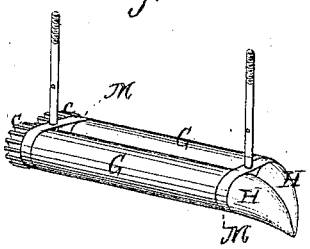
Figure 4 represents the upper portion of the machine detached therefrom.

The same letters of reference are used in all the figures.

A is the bed of the machine, which should be secured to a bench or table.

C, in each case, represents C-shaped standards.

B represents a shaft-block.

D is the operative shaft, to the outer end of which crank or other power is to be applied.

E, in each case, represents one of three metallic bed-rollers. They are so mounted that their centers are parallel with each other, and two are placed above the third, in such a manner that a line of a circle drawn from a common center equidistant from each would engage with their several peripheries.

F, in each case, represents a stationary horn-shaped finger. Its inner or large end is of the same diameter as the rollers, and the outer end is pointed. There is one of these fingers for each of the rolls E. The lower finger has its outer end curved upward, while the side fingers curve inward.

G, in each case, represents one of two metallic pressing-rollers. They are so mounted that their axes are on lines parallel with those of rollers E.

H represents a pair of stationary horn-shaped fingers, one to each roll G, corresponding to those already described. Their ends turn inward and downward.

The rollers E are set in collar-blocks, I, at each end.

Each of these is mounted upon a spring-stem, K, which passes through a pair of stationary longitudinal bars, L.

The said stems are embraced by spiral springs, so set that they bear with expansive force between the inner side of the outer bars L and a pin in the stems K.

Each of the stems K has a screw-thread cut thereon, and has a nut fitted to its outer end.

The arrangement of springs and mechanism is such that the three rollers press toward each other by the force of the several spiral springs, and also to admit of their ready adjustment with relation to each other.

The fingers F and H are attached fixedly to the outer collars I and M.

R represents a metallic smoothing-plate attached to the standards.

The pressing-rollers G are mounted, side by side, in double collars, M, placed at each end. These collars are, like the others described, mounted upon spring-stems. Instead of the stationary longitudinal bars L, however, these rollers G, collars M, and their spring-stems, are mounted in a vertically-adjustable frame, N, fitted to grooves cut in the inner faces of the standards C.

The frame N is secured, at its top and center, to a rod, O, which extends longitudinally to a point at the rear of the bed-plate, then, turning at a right angle, passes downward through the bench or table on which the machine is placed.

The rod O is embraced by a circular spiral spring, so set that its expansive force sustains the weight of the frame N and rollers G.

To this rod I purpose attaching a treadle, or equivalent device, for readily depressing the same.

Upon the operative end of the shaft D there is a long toothed gear, a.

Each of the bed-rollers E has attached to its end a gear, b, which meshes with gear a.

The pressing-rollers G are provided with gears c, which mesh with each other.

The geared end of the shaft D contains a splined spindle, P, capable of independent longitudinal movement only by means of the circular knob Q.

The outer end of the spindle is secured to a bladed fork, T, the whole so arranged that, as the shaft revolves, the spindle and fork revolve with it.

It is our purpose to have the fork-tines, in practice, so set as to be capable of complete withdrawal into the end of the shaft D.

The operation of our machine is as follows:

A cigar ready for the wrapper is placed into the recess formed by the bed-rollers E. The fork T is then forced into the large end of the cigar. By means of a treadle, or its equivalent, the pressing-rollers G are brought down so that each of their gears c will mesh with the driving-gear a, while with the right hand the leaf is held with proper tension upon the smoothing-plate R, and inclined to the right. The left hand may then operate the machine by turning the main shaft, which will cause all the rollers to revolve together in an opposite direction to that in which the main shaft, with the cigar, is being revolved. Meantime, the right hand should feed in the wrapper to the fire end of the cigar, and maintain the proper incline toward the right of the machine. When the small end of the cigar is reached by the wrapper, the stationary curved fingers F and H perform a similar service in pointing the end of the cigar to that performed by the fingers of the hand after the old method.

Having thus described our invention,

We claim as new and desire to secure by Letters Patent—

1. The bed-rollers E, provided with stationary horn-shaped fingers F, in combination with the pressing-rollers G, mounted in a vertically-sliding frame, and each provided with a stationary horn-shaped finger, H, the whole operated by the shaft D and suitable gearing, substantially as shown and described.

2. The combination of the rollers of a cigar-wrapping machine with bearing-collars and stems K, the latter being provided with suitable spring devices, so set as to admit of the ready adjustment of the rollers relatively to each other, substantially as shown and described.

GEORGE W. TANNER.
F. D. BLISS.

Witnesses:
HENRY MARTIN,
JOHN C. PURKIS.